US012385631B2

(12) United States Patent
Onesto

(10) Patent No.: US 12,385,631 B2
(45) Date of Patent: Aug. 12, 2025

(54) BUSHING ARM AND RELATED CHANDELIERS

(71) Applicant: Alex Fusato, Lido di Venezia (IT)

(72) Inventor: Armando Onesto, Murano Venezia (IT)

(73) Assignee: Alex Fusato, Lido di Venezia (IT)

( * ) Notice: Subject to any disclaimer, the term of this patent is extended or adjusted under 35 U.S.C. 154(b) by 0 days.

(21) Appl. No.: 18/772,188

(22) Filed: Jul. 14, 2024

(65) Prior Publication Data

US 2025/0035292 A1 Jan. 30, 2025

(30) Foreign Application Priority Data

Jul. 26, 2023 (IT) ........................ 102023000015654
Jun. 17, 2024 (EP) .................................... 24182720

(51) Int. Cl.
*F21V 21/108* (2006.01)
*F21V 21/116* (2006.01)
*F21V 23/00* (2015.01)

(52) U.S. Cl.
CPC .......... *F21V 21/108* (2013.01); *F21V 21/116* (2013.01); *F21V 23/002* (2013.01)

(58) Field of Classification Search
CPC ..... F21V 21/108; F21V 21/116; F21V 23/002
USPC .......................................................... 362/432
See application file for complete search history.

(56) References Cited

U.S. PATENT DOCUMENTS 762,535 A * 6/1904 Kelsey ................... H01R 33/92 439/643
7,387,522 B2 * 6/2008 Janos ..................... H01R 33/46 439/314
2003/0228190 A1 * 12/2003 Hsu ......................... F21S 8/065 403/388
2005/0042917 A1 * 2/2005 Wu ......................... F21S 8/065 439/551
2019/0137055 A1 * 5/2019 Liu ......................... F21S 6/002
2021/0356110 A1 * 11/2021 Zhang ................. F21V 33/0056

* cited by examiner

*Primary Examiner* — Christopher M Raabe
(74) *Attorney, Agent, or Firm* — Carmel Patent Agency; Robert Ballarini

(57) ABSTRACT

The present invention concerns a special arm, called bush arm, for chandeliers, lamps or wall lamps equipped with at least one arm which has at least one light point and where said arm is preferably made of glass.

19 Claims, 8 Drawing Sheets

BUSHING ARM AND RELATED CHANDELIERS

TECHNICAL FIELD

The present invention relates to the lighting sector, in particular to the sector of chandeliers, lamps or wall lamps.

STATE OF THE ART

The present invention concerns a special arm, called bushing arm, for chandeliers, lamps or wall lamps equipped with at least one arm which has at least one light point and where said arm is preferably made of glass.

As is well known, chandeliers, in particular those made of glass, such as for example the so-called Murano chandeliers, are made by assembling a central body and various arms which carry the light point.

Said assembly is carried out by fixing the arms on a horizontal panel/plane part of the central body. This fixing is achieved by inserting the end part of the arm onto this panel. This type of assembly involves two problems: the first is that the arms can, accidentally, for example during cleaning or in the presence of an earthquake, lift slightly with respect to the horizontal panel, thus detaching from it and therefore falling to the ground or being damaged.

The second problem is that said plane must be horizontal, creating limitations on the possibility of creating chandeliers, lamps or appliques of different designs.

Finally, the third problem is that it is not possible to create chandeliers in which the arm is located below the horizontal panel or it is not possible to insert the arm by fixing it under the horizontal plane as the arm would fall immediately due to gravity.

This aspect strongly limits the possibility of creating chandeliers and lamps, especially the so-called Murano chandeliers with innovative shapes.

SUMMARY OF THE INVENTION

The problem addressed by the present invention is therefore to provide an arm for a chandelier, lamp or wall light which simultaneously solves the aforementioned problems with reference to the state of the art.

These problems are solved by arm (1) of the present invention, as outlined in the attached claims, the definitions of which are an integral part of the present description.

In particular, the invention has as its object arm for chandelier, lamp or wall lamp which, through the particular combination of the pieces that compose it, allows the creation of chandeliers, preferably glass chandeliers, with particular configurations of the elements that compose them, allowing, for example, to be able to fix the glass arms on the lower part or from below compared to the chandelier without said arms falling due to gravity.

Further characteristics and advantages of the arm of the invention will appear from the description of the figures of the invention, being embodiments of the invention, provided as an indication thereof.

BRIEF DESCRIPTION OF THE FIGURES

For the purposes of understanding the following figures, the following legend is reported.

(1) arm for chandelier, lamp or wall light,
(2) arm,
(3) light point, (4) electrical wires,
(5) end part of the arm (2),
(6) fixing element,
(7) cylinder cable,
(8) cylindrical cavity of the hollow cylinder (7),
(9) closing flat bottom,
(10) hole in the closing flat bottom (9),
(11) cylinder cable flange (7),
(12) thread present on the external surface of the hollow cylinder (7),
(13) metal ring,
(14) flat support of the chandelier, lamp or wall light,
(15) flat support hole (14) of the chandelier, lamp or wall light,
(16) annular channel obtained in the flat support (14), around the hole (15).

Figure 5:
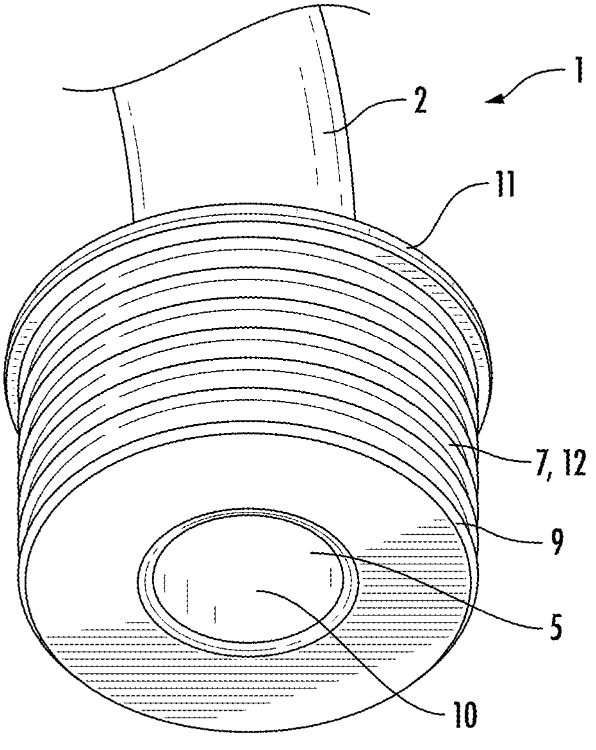

The FIG. 5 shows a front view from below of part of the arm (1) of the invention.

Figure 6:
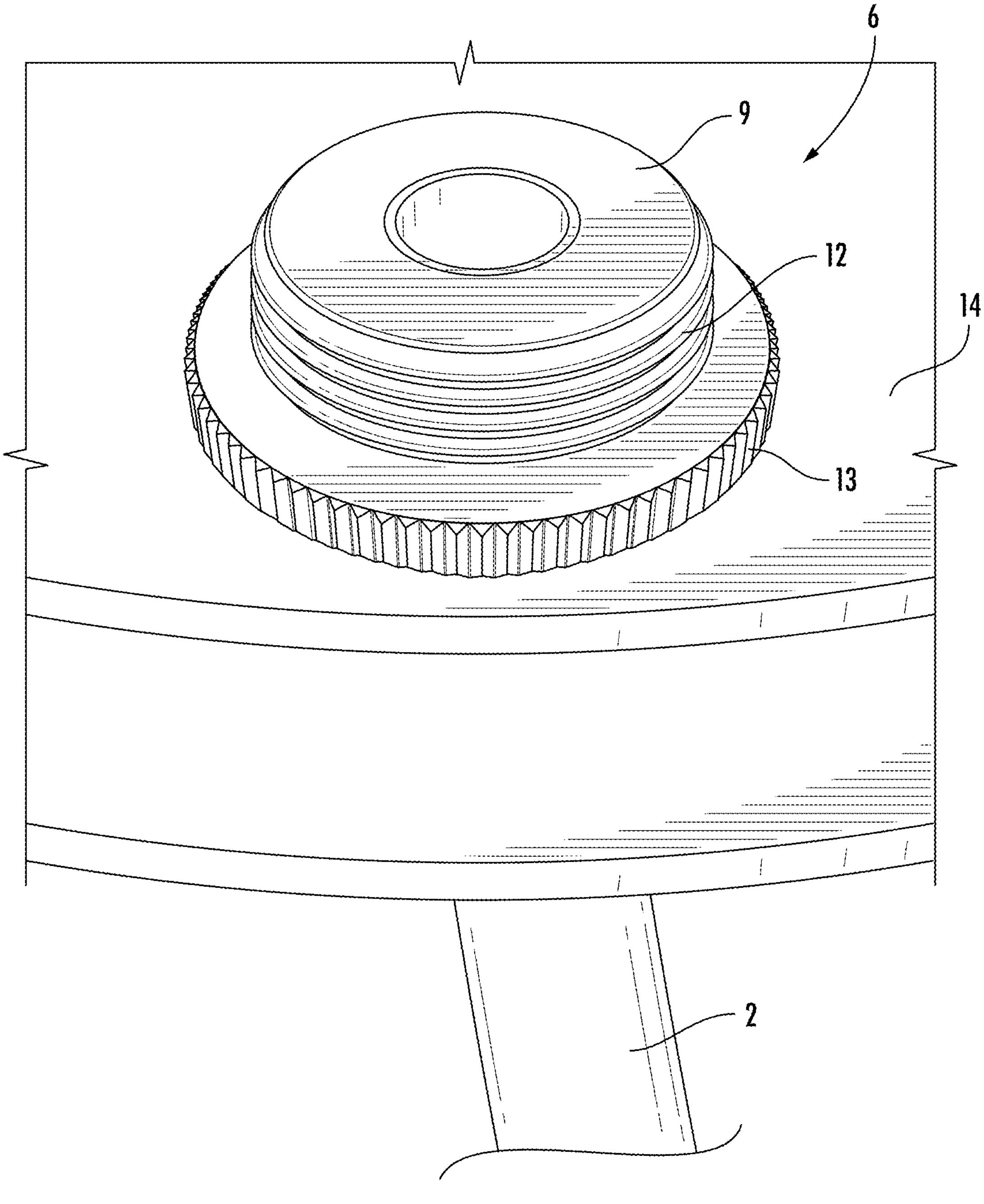
Figure 7:
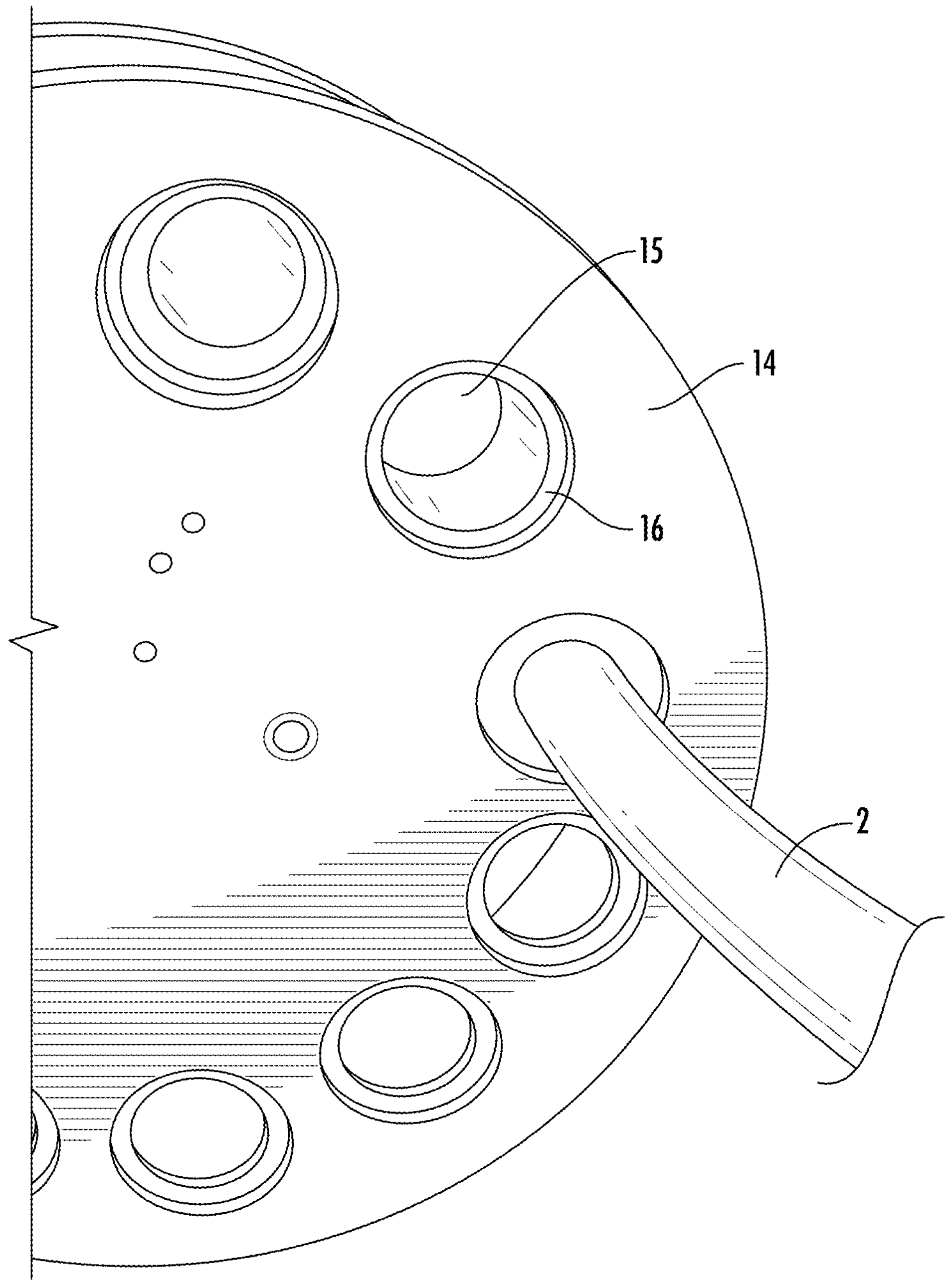
Figure 8:
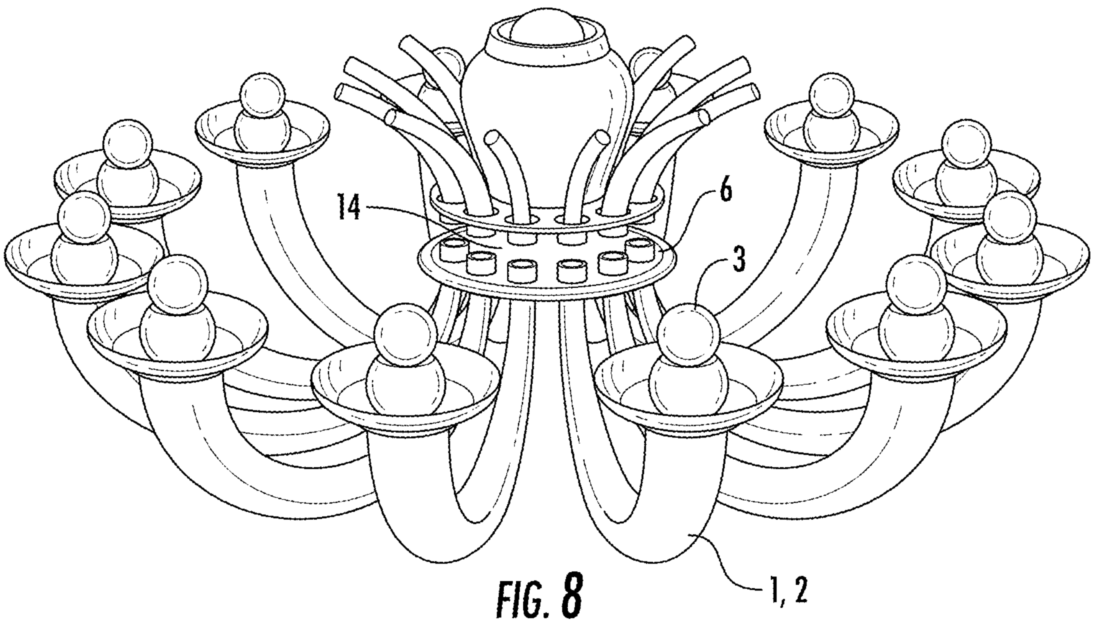
Figure 9:
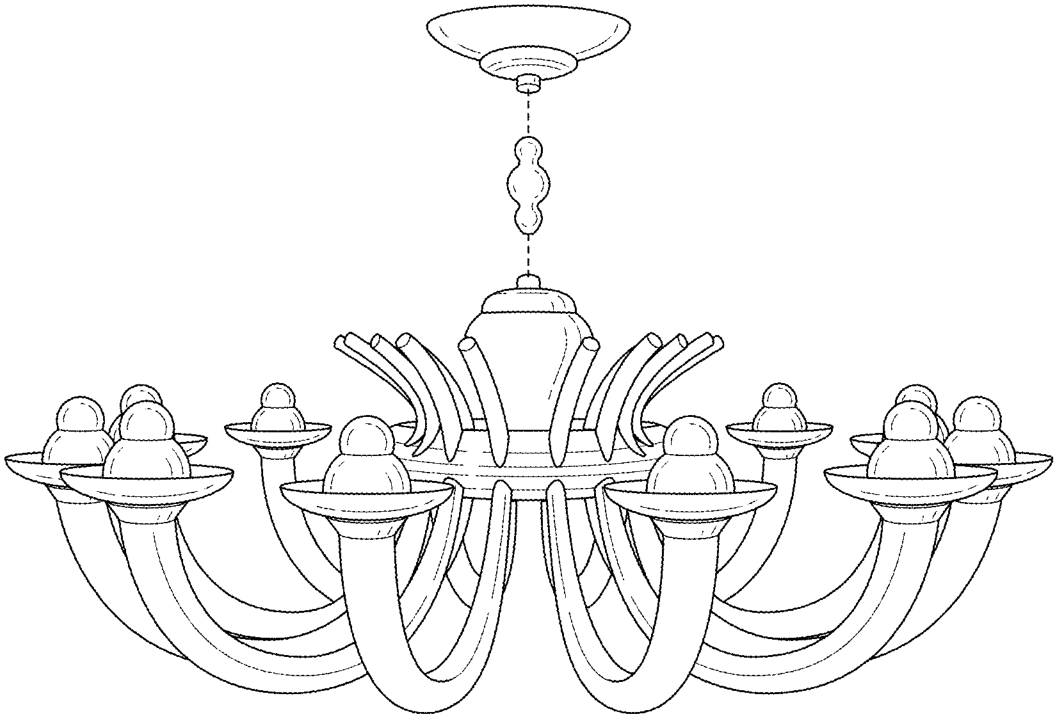
Figure 10:
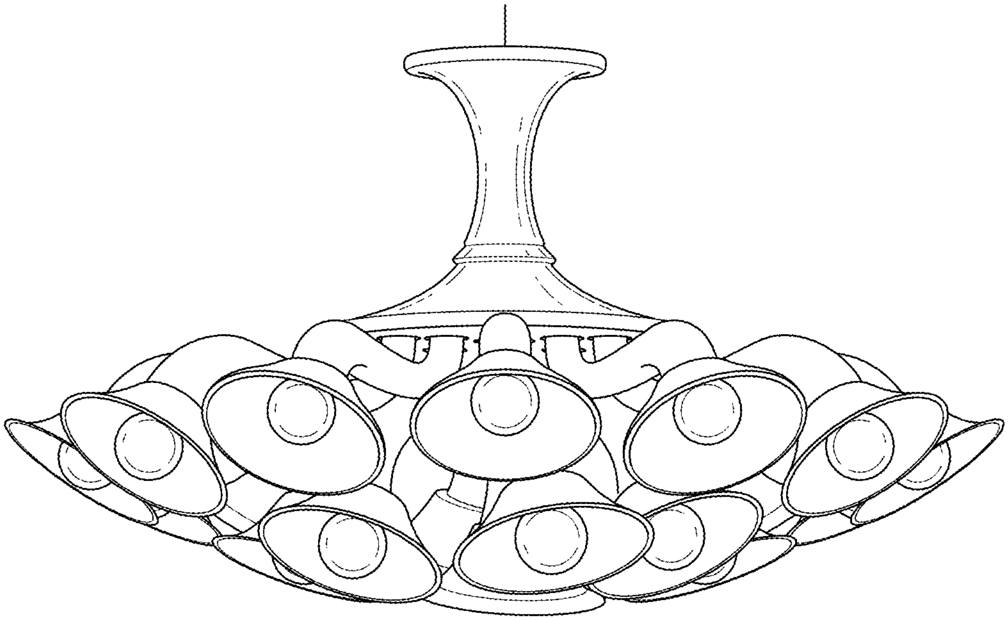
Figure 11:
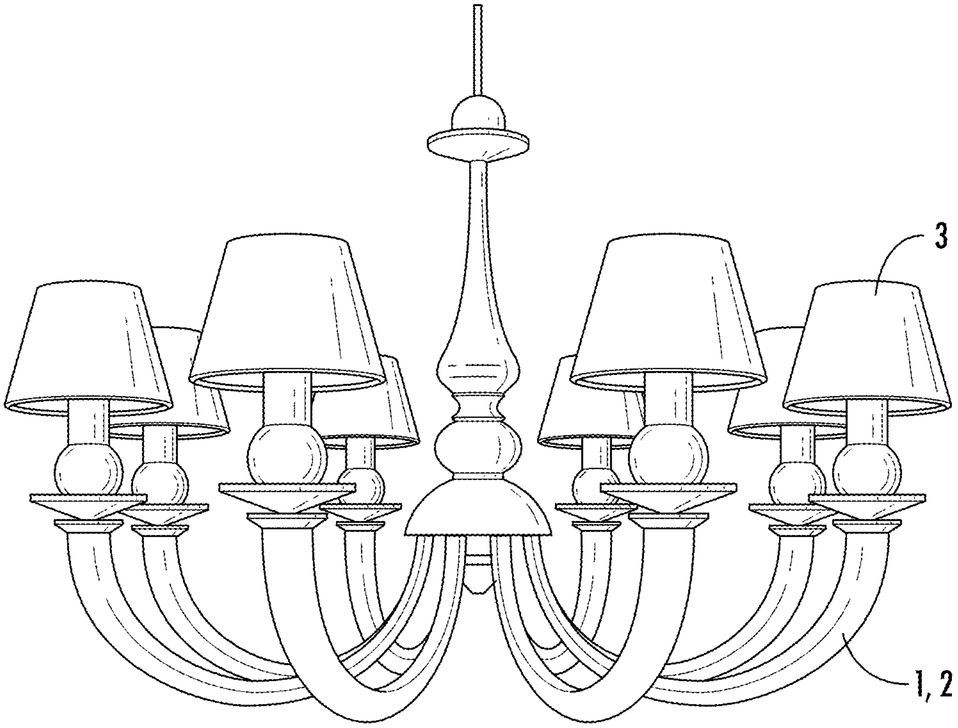
Figure 12:
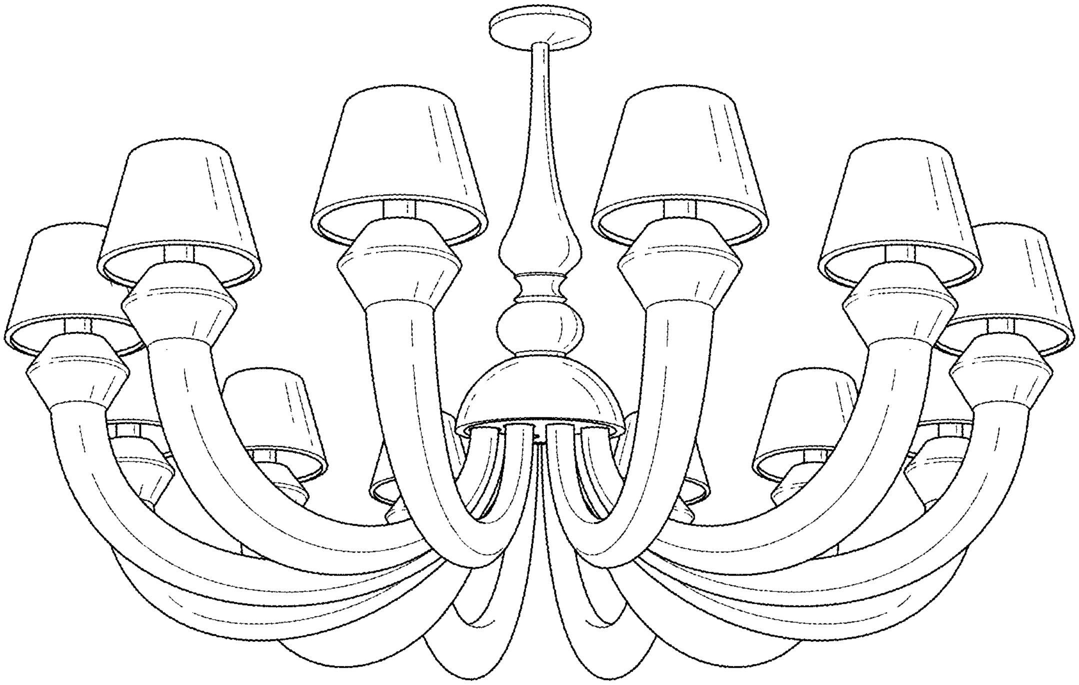

The FIGS. 6 and 7 show the arm (1) fixed on the surface (14) of the chandelier, lamp or wall lamp using the fixing element (6).

The FIGS. 8, 9, 10, 11 and 12 show how with the arm (1) of the invention, in particular, thanks to the fixing element (6) it is possible to create chandeliers in which the glass arms are arranged below the top (14) of fixing the chandelier, creating innovative glass structures, in particular, creating innovative Murano glass chandeliers.

DETAILED DESCRIPTION OF THE INVENTION

Figure 1:
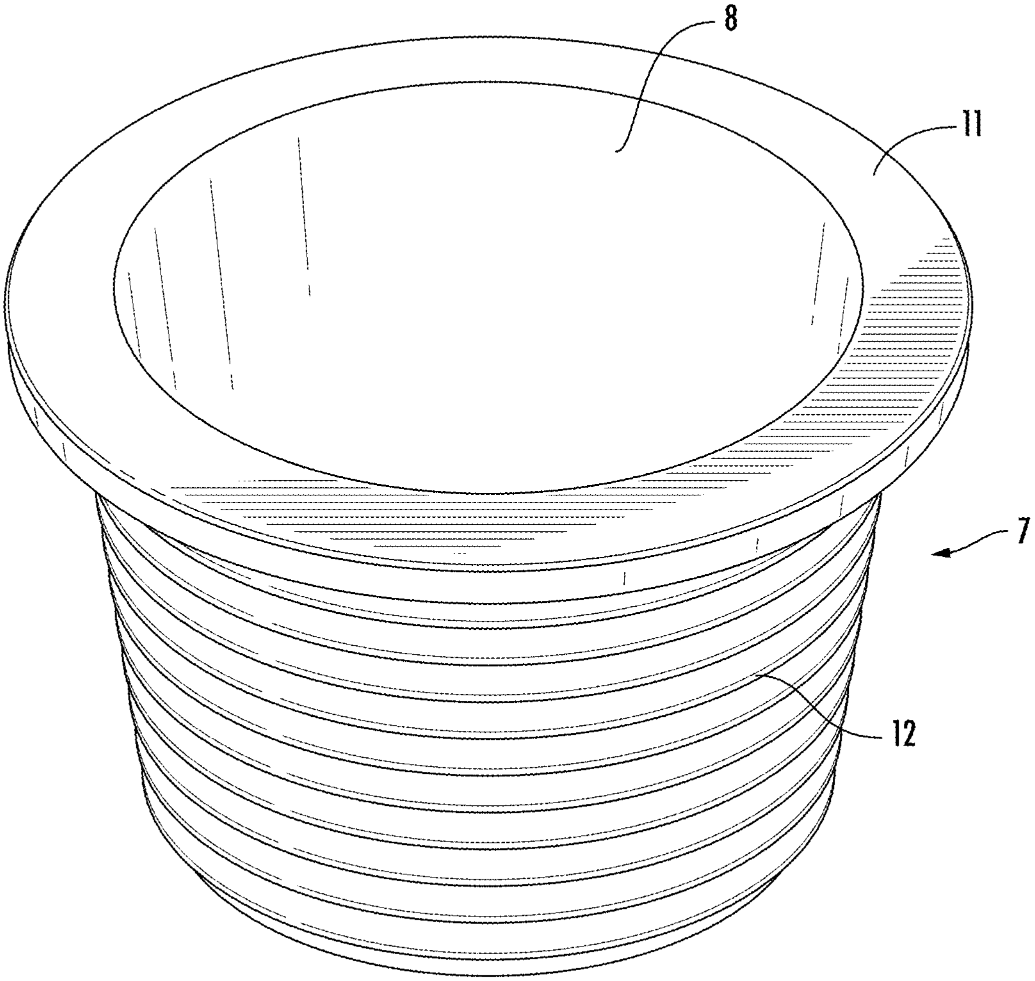
FIG. 1 shows a front perspective representation of the hollow cylinder (7) forming part of the fixing element (6) of the invention which incorporates the features of the invention, in particular, the cylindrical cavity (8) of the hollow cylinder is evident (7), the flange (11) of the hollow cylinder (7) and the thread (12) present on the external surface of the hollow cylinder (7).
Figure 2:
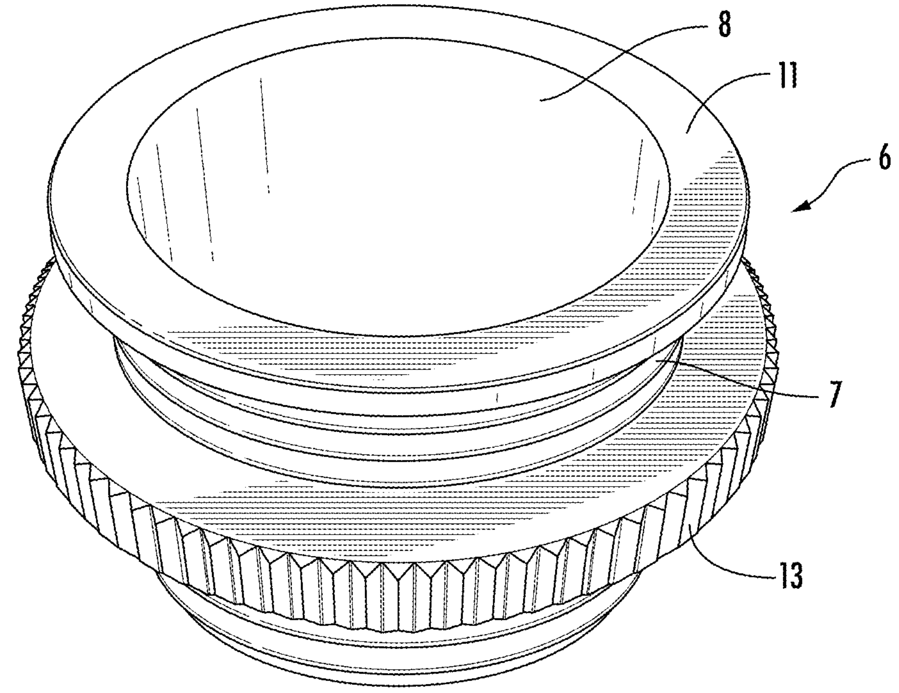
FIG. 2 shows a front perspective representation of the fastener (6), in which the hollow cylinder (7), the cylindrical cavity (8) of the hollow cylinder (7), the flange (11) of the hollow cylinder are highlighted (7) and the metal ring (13).
Figure 3:
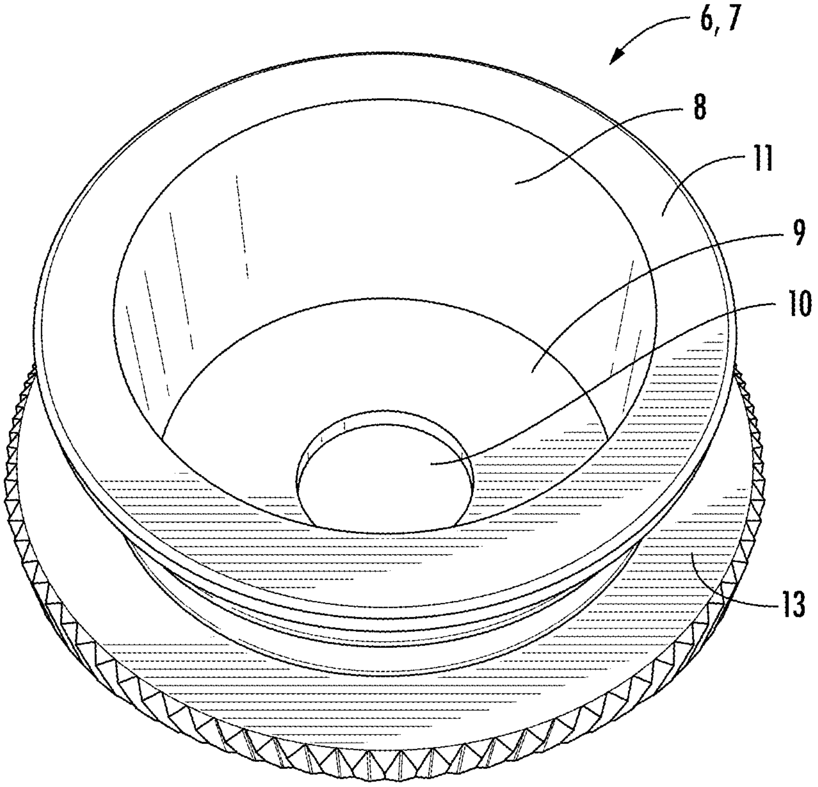
FIG. 3 shows a perspective view from above of the fixing element (6) of the invention, which, in addition to the previous figures, shows the flat closing bottom (9) and the hole (10) of the flat bottom closing (9).
Figure 4:
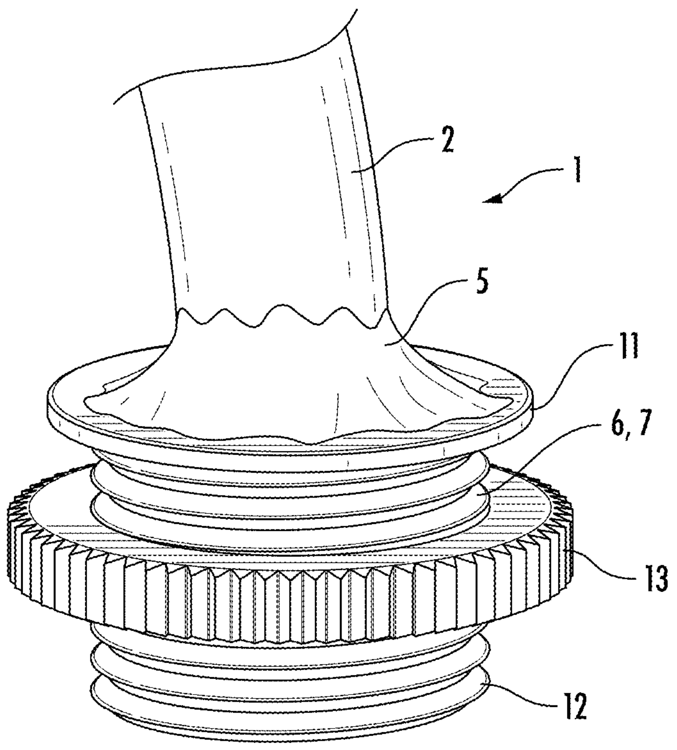
FIG. 4 shows a front view of part of the arm (1) of the invention, in which part of the arm (2), the fixing element (6) with its components is seen, in particular, with reference to the cylinder cable (7) you can see the flange of the hollow cylinder (7), the thread (12) present on the external surface of the hollow cylinder (7), and, with reference to the fastening element (6) you can see the metal ring nut (13).

For purposes of description herein, the terms "right", "left", "back", "front", "vertical", "horizontal" and their derivatives refer to the concepts oriented in FIG. 1.

However, it should be understood that the concepts can take various alternative orientations, unless expressly specified to the contrary.

As used herein, the term "and/or", when used in a list of two or more items, means that any of the listed items may be employed alone, or in any combination of two or more of the listed items.

For example, if a combination is described as containing components A, B and/or C, the combination may only contain A; B only; C only; A and B in combination; A and C in combination; B and C in combination; or A, B and C in combination.

The terms "includes", "comprising" or any other variation thereof, are intended to cover a non-exclusive inclusion, such that an object, apparatus, etc. that includes a list of items does not include only those items but may include other items not expressly listed or inherent in such method, use, or apparatus.

An element followed by "includes . . . a . . . " does not prevent, without further constraints, the existence of further identical elements in the object, apparatus, etc. which includes the element.

An object of the present invention is an arm (1) for chandelier, lamp or wall light comprising:

- an arm (2) including at least one light point (3), said arm (2) having a tubular structure suitable for hosting electrical wires (4) inside it suitable for powering the light point (3), said arm (2) having an end part (5) configured to be fixed to a fixing element (6), wherein said arm (2) is substantially made of glass, crystal or similar materials;
- a fixing element (6), where said fastener (6) is made of metal or metal alloys and where said fixing element (6) comprises:
  - a) a hollow cylinder (7), having a cylindrical cavity (8) coaxial with the longitudinal axis of the hollow cylinder (7) and where said cylindrical cavity (8) is open at the top and is configured to accommodate the end part (5) of the arm (2), where said cylindrical cavity (8) has a flat closing bottom (9) at the bottom, where said flat closing bottom (9) has a hole (10) suitable for being passed through by electrical wires (4),
  - where said hollow cylinder (7) has a flange (11) on top, where the external surface of said hollow cylinder (7) has a thread (12), where said thread (12) extends up to the flange (11) and is configured to accommodate a metal ring nut (13),
  - b) a metal ring (13) configured to screw onto the thread (12) of the hollow cylinder (7), where said metal ring (13), abutting on a flat support (14) of the chandelier, lamp or wall lamp, where said support (14) has a hole (15) suitable for hosting the hollow cylinder (7), keeps the metal ring (13) interlocked with the flange (11) allowing the fixing element (6) to be fixed to a flat support (14) of the chandelier, lamp or wall light.

It has in fact been surprisingly found that making an arm (1) for a chandelier, lamp or wall lamp with the aforementioned combination of elements allows the three aforementioned problems to be solved at the same time with reference to the known art, and preferably, when the chandelier is made of glass.

The surface of the cylindrical cavity (8) can be smooth, substantially smooth or rough. Preferably the surface of the cylindrical cavity (8) is substantially smooth.

The arm (2) can be made of different materials such as, for example, metal, glass, crystal, plastic, etc. Preferably the arm (2) is made of glass.

The fixing element (6) is made of metal, such as, for example, iron, aluminium, brass, etc. Preferably the fixing element (6) is made of aluminium.

The end part (5) of the arm (2) is fixed to the fixing element (6) using plaster, putty or similar, adhesives or glues, etc. Preferably, the end part (5) of the arm (2) is fixed to the fixing element (6) using plaster, stucco or similar.

The flange (11) is an external lip or an external protruding edge.

The metal ring (13) is a ring with internal thread. Preferably, the external surface of the metal ring (13) is knurled, to allow for better screwing of the same onto the hollow cylinder (7).

Preferably, the one end part (5) of the arm (2) is housed inside the cylindrical cavity (8) of the fastening element (6), and where the end part (5) of the arm (2) it extends up to the flat closing bottom (9) of said cylindrical cavity (8).

Preferably, the end part (5) of the arm (2) is housed inside the cylindrical cavity (8) of the fixing element (6), and where the end part (5) of the arm (2) passes at least partially through the hole (15) of the flat support (14) of the chandelier, lamp or wall light.

The crossing of the hole (15) of the flat support (14) by the end part (5) of the arm (2) preferably occurs vertically.

More preferably the end part (5) of the arm (2) completely passes through the hole (15) of the flat support (14) of the chandelier, lamp or wall light. This gives greater solidity or robustness to the arms, preventing, among other things, them from bending with respect to the surface (14).

Preferably, the end part (5) of the arm (2) is housed inside the cylindrical cavity (8) of the fixing element (6), and where the end part (5) of the arm (2) is extends up to the flat closing bottom (9) of said cylindrical cavity (8) and where the end part (5) of the arm (2) passes at least partially through the hole (15) of the flat support (14) of the chandelier, lamp or wall light. More preferably the end part (5) of the arm (2) completely passes through the hole (15) of the flat support (14) of the chandelier, lamp or wall light. This gives greater solidity or robustness to the arms, preventing, among other things, them from bending with respect to the surface (14).

Preferably, the cylindrical cavity (8) of the fixing element (6) passes at least partially through the hole (15) of the flat support (14) of the chandelier, lamp or wall light. More preferably, the cylindrical cavity (8) of the fixing element (6) completely passes through the hole (15) of the flat support (14) of the chandelier, lamp or wall light.

Another object is a chandelier, lamp or wall light comprising at least one arm (1) as described above.

Said chandelier, lamp or wall light preferably comprises at least one flat support (14), where said flat support (14) comprises at least one hole (15) suitable for hosting the hollow cylinder (7) of the fixing element (6), where said hole (15) is configured to keep the metal ring (13) mutually interlocked with the flange (12) of the fixing element (6).

Preferably, the aforementioned chandelier, lamp or wall light, includes at least one flat support (14), where said flat support (14) includes at least one hole (15) suitable for hosting the hollow cylinder (7) of the fixing element (6), where said hole (15) is surrounded by an annular channel (16) obtained in the flat support (14), where said annular channel (16) is configured to house the flange (11) of the hollow cylinder (7).

Preferably, the annular channel (16) houses the flange (11) entirely.

The annular canal (16) can have different sections, for example square, rectangular, semicircular, etc. Preferably the annular channel (16) has a rectangular section.

Furthermore, preferably, the flange (11) has a rectangular section.

Furthermore, more preferably, both the annular channel (16) has a rectangular section and the flange (11) has a rectangular section.

The arm (1) of the present invention allows the creation of chandeliers with unusual geometries, especially when the chandelier is made of glass or similar materials. In particular, thanks to the fixing element (6) it is possible to position the arm (1) below, i.e. below, compared to the surface (14) of the chandelier, lamp or wall light.

Therefore, according to a preferred embodiment, the chandelier, lamp or wall light provides that the arm (2) extends lower than the flat support (14) of the chandelier, lamp or wall light and/or that the arm (1) is fixed on the lower surface of the flat support (14).

The flat support (14) of the chandelier is preferably arranged horizontally with respect to the vertical axis of the chandelier. However, different orientations of this plane (14) could be envisaged, for example the flat support (14) can be arranged obliquely with respect to the vertical axis of the chandelier, lamp or wall light.

According to a preferred embodiment, the chandelier is made of glass or crystal, preferably it is substantially made of glass or crystal, there being also non-glass or crystal elements such as for example the electrical wires and the top (14). More preferably these are the so-called "Murano chandeliers".

Another object is therefore the use of the arm (1) for the creation of chandeliers, lamps or wall lights.

All the individual pieces making up the arm (1) are easily made, and, considering the figures shown here, their assembly does not require further inventive efforts.

Furthermore, all the details can be replaced by other technically equivalent ones. In practice, the materials used, as well as the shapes and dimensions, may be any according to needs without departing from the scope of protection of the following claims.

The invention claimed is:

1. Arm for chandelier, lamp or applique, the arm comprising:

- an arm comprising at least one light point, said arm having a tubular structure suitable for housing electrical wires therein for supplying the light point, said arm having an end part configured to be fixed to a fixing element, wherein said arm is substantially made of glass, crystal or similar materials;
- a fixing element, where said fixing element is made of metal or metal alloys and wherein said fixing element comprises:
  - a hollow cylinder, having a cylindrical cavity coaxial with the longitudinal axis of said hollow cylinder wherein said cylindrical cavity is open at a top portion thereof and is configured to accommodate the end part of said arm, wherein said cylindrical cavity has a flat bottom end at a bottom portion thereof, wherein said flat bottom end has a hole through which the electrical wires are passed, said hollow cylinder having a flange at the top, where an outer surface of said hollow cylinder has a thread, said thread extends to the flange and is configured to accommodate a metal ferrule,
  - the metal ferrule configured to screw onto the thread of the hollow cylinder, wherein said metal ferrule, when in abutment with a flat support of the chandelier, lamp or applique, the flat support having a hole for accommodating the hollow cylinder,
  - retains the metal ferrule with the flange mutually interlocked, enabling the fixing of the fixing element to the flat support of the chandelier, lamp or applique.

2. The arm according to claim 1, wherein the surface of the cylindrical cavity is substantially smooth.

3. The arm according to claim 1, wherein the arm is made of glass.

4. The arm according to claim 1, wherein the fixing element is made of aluminium aluminum.

5. The arm according to claim 1, wherein the end part of the arm is fixed to the fixing element by plaster, putty or the like.

6. The arm according to claim 1, wherein the end part of the arm is housed inside the cylindrical cavity of the fixing element, and wherein the end part of the arm extends to the flat closing bottom of said cylindrical cavity.

7. The arm according to claim 1, wherein the end part of the arm is housed inside the cylindrical cavity of the fixing element, and where the end part of the arm passes at least partially through the hole of the flat support of the chandelier, lamp or wall light.

8. The arm according to claim 7, in which the end part of the arm completely passes through the hole of the flat support of the chandelier, lamp or wall light.

9. The arm according to claim 1, wherein the end part of the arm is housed inside the cylindrical cavity of the fixing element, and where the end part of the arm extends up to the flat closing bottom of said cylindrical cavity and where the end part of the arm passes at least partially through the hole of the flat support of the chandelier, lamp or wall light.

10. The arm according to claim 9, in which the end part of the arm completely passes through the hole of the flat support of the chandelier, lamp or wall light.

11. Chandelier, lamp or applique comprising at least one arm according to claim 1.

12. The chandelier, lamp or applique according to claim 11, comprising at least one flat support, wherein said flat support comprises at least one hole adapted to accommodate the hollow cylinder of the fixing element, wherein said hole is configured to mutually retain the metal ferrule with the flange of the fixing element.

13. The chandelier, lamp or applique according to claim 11, comprising at least one flat support, wherein said flat support comprises at least one hole suitable to accommodate the hollow cylinder of the fixing element, wherein said hole is surrounded by an annular channel formed in the flat support, wherein said annular channel is configured to accommodate the flange of the hollow cylinder.

14. The chandelier, lamp or applique according to claim 13, wherein said annular channel accommodates the flange in its entirety.

15. The chandelier, lamp or applique according to claim 11, wherein the arm extends inferiorly with respect to the flat support of the chandelier, lamp or applique and/or wherein the arm is fixed on the lower surface of the flat support.

16. The chandelier, lamp or applique according to claim 12, wherein the end part of the arm is housed inside the cylindrical cavity of the fixing element, and the end part of the arm passes at least partially through the hole of the flat support of the chandelier, lamp or applique.

17. The chandelier, lamp or applique according to claim 16, in which the end part of the arm completely passes through the hole of the flat support of the chandelier, lamp or wall light.

18. The chandelier, lamp or applique according to claim 12, wherein the end part of the arm is housed inside the cylindrical cavity of the fixing element, and where the end part of the arm extends up to the flat closing bottom of said cylindrical cavity and where the end part of the arm passes at least partially through the hole of the flat support of the chandelier, lamp or wall light.

19. The chandelier, lamp or applique according to claim 18, wherein the end part of the arm completely passes through the hole of the flat support of the chandelier, lamp or wall light.

* * * * *